United States Patent Office 3,029,861
Patented Apr. 17, 1962

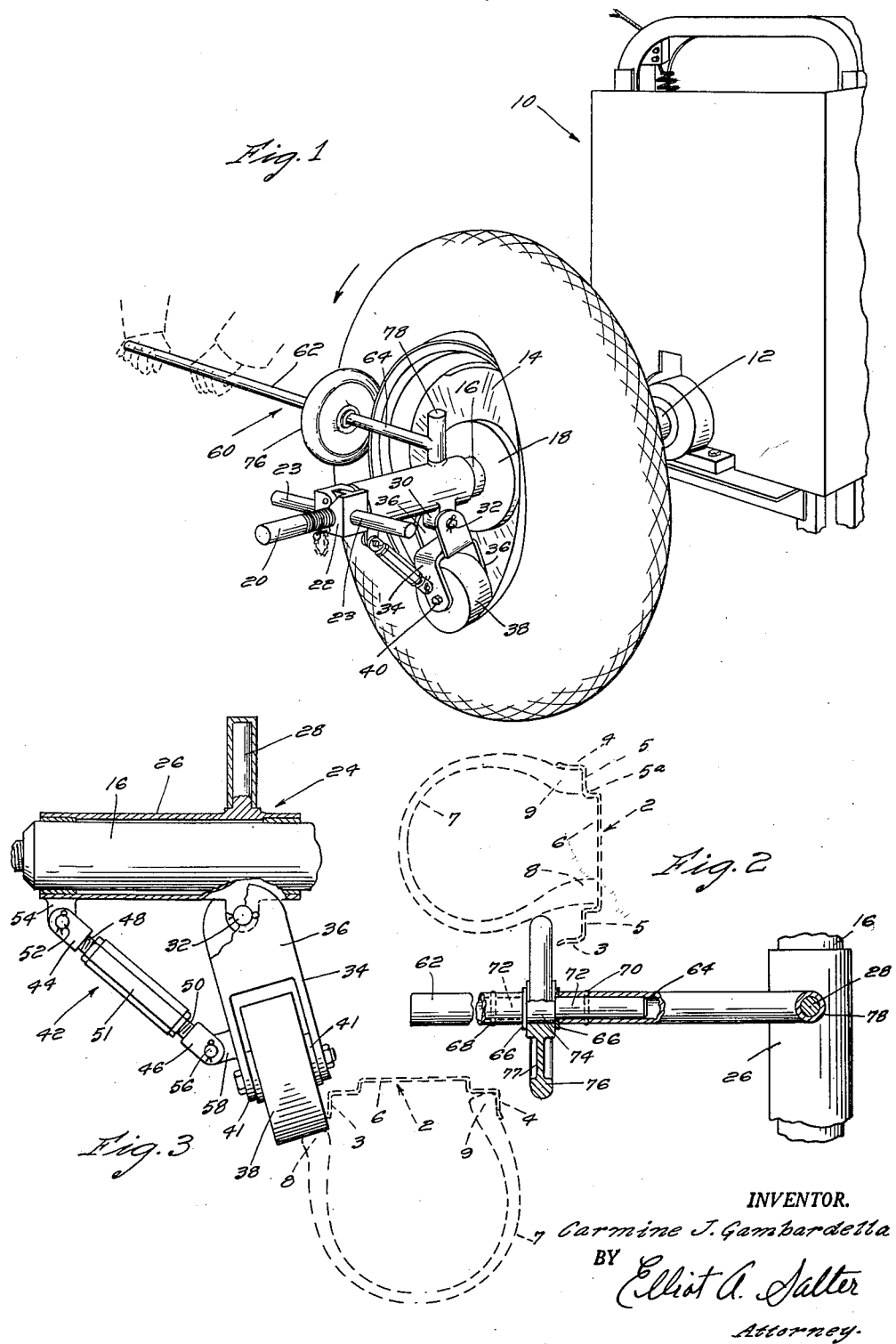

3,029,861
TIRE MOUNTING APPARATUS
Carmine J. Gambardella, Warwick, R.I., assignor to Lee Engineering Company, Pawtucket, R.I., a corporation of Rhode Island
Filed July 8, 1959, Ser. No. 825,725
8 Claims. (Cl. 157—1.22)

The present invention relates to apparatus for mounting pneumatic tires on vehicular wheels having a so-called drop center rim. More particularly, the present invention relates to pneumatic tire mounting apparatus that includes power means for rotating a vehicle wheel mounted thereon, and a simple but effective tool and roller assembly that cooperates with the power means to easily and quickly force the tire onto the vehicle wheel.

The chief difficulty experienced in mounting tires on the rim of a wheel by conventional tire mounting apparatus is the forcing of the tire bead over the rim flange. For the first quarter of the wheel, the tire bead can be easily forced over the flange of the rim, but due to the resistance of the tire wall and the construction of the rim flange, the remaining portion of the tire bead cannot, without considerable effort, be forced into its properly mounted position since sufficient clearance does not exist for the tire to clear the rim flange. Prior to the instant invention several forms of tire mounting equipment have been commercially produced but have not successfully solved the tire mounting problems involved. These prior known tire mounting devices depend to a great extent on the skill and strength of the operator to force the bead of the tire over the flange of the rim.

The present invention overcomes the attendant difficulties experienced with the heretofore known tire mounting equipment and incorporates manually controlled bead deflecting rollers which cooperate with power operated apparatus for enabling a tire to be easily and quickly mounted on the rim of a wheel regardless of the skill of the operator.

It is, therefore, an object of the present invention to provide tire mounting apparatus that simply and effectively mounts pneumatic tires on a vehicle wheel having a drop center rim.

Another object of the present invention is to provide tire mounting apparatus which includes means for automatically and continuously rotating the wheel during the tire mounting operation.

Still another object is to provide tire mounting apparatus that incorporates a single handle control for mounting a tire on a wheel.

Still another object is to provide a bracket assembly having a bead deflecting roller mounted thereon for forcing the bead of the tire over the flange of the wheel rim.

Still another object is to provide a handle pivotally mounted on said bracket assembly and carrying a forcing tool thereon, said forcing tool forcing the adjacent portion of the tire bead into the well or drop center of the wheel rim, thereby enabling the portion of the bead located adjacent to the aforesaid roller to be forced over the rim flange by said roller.

Still another object is to position the forcing tool approximately 90° from the roller with respect to the rim of the wheel, the wheel being rotated in a direction to cause the tire bead to engage the forcing tool prior to engaging the roller.

Still another object is to provide for adjustment of said roller in an angular position with respect to the tire and rim.

Other objects and the nature and advantages of the instant invention will be apparent from the following description taken in conjunction with the accompanying drawings, wherein:

FIG. 1 is a perspective view of the tire mounting apparatus embodied in the present invention;

FIG. 2 is an enlarged top plan view of the forcing tool, partly in section, illustrating the manner in which the bead of the tire is forced into the well or drop center of the rim; and FIG. 3 is an enlarged side elevational view of the angularly disposed roller, partly in section, illustrating the manner in which the bead of the tire is forced over the flange of the rim.

The tire mounting apparatus embodied herein is adapted to be utilized for mounting pneumatic vehicular tires on wheels incorporating a one-piece or drop center type of rim. The drop center rim is the conventional style of rim used in connection with passenger vehicles and the like and, as shown in FIGS. 2 and 3, includes a rim indicated at 2 formed with opposed annular flanges 3 and 4 having mounting surfaces 5 stepped inwardly as at 5a to define an annular well or drop-center recess 6. A tire 7 is adapted to be mounted on the rim 2 and includes beads 8 and 9 that are forced over the flanges 4 during the mounting operation, it being understood that when the tire is properly mounted, beads 8 and 9 seat on the surfaces 5.

Referring now to FIG. 1, the tire mounting device embodied herein is illustrated and includes power operated apparatus generally indicated at 10. The power operated apparatus 10 includes an outwardly extending power driven shaft 12, a portion of which is seen in FIG. 1 and which is adapted to be rotated at approximately four r.p.m. The shaft 12 and the associated apparatus 10 are adapted to be elevated by suitable means (not shown) which are described in copending application, Serial No. 825,724, filed concurrently herewith for Tire Demounting Apparatus. As illustrated and described in the aforesaid copending application, the outer end of the shaft 12 has a wheel cone secured thereto that is formed with stepped annular flanges upon which a wheel 14 is mounted. In order to positively retain the wheel 14 on the wheel cone a tubular wheel holding shaft 16 is provided, the wheel holding shaft 16 terminating in a circular retaining disc 18 that abuts against the outer surface of the wheel 14. A threaded spindle 20 (FIG. 1) extends through the tubular shaft 16 and disc 18 and is provided with a coupling (not shown) that is adapted to engage a reduced portion (not shown) formed on the outer end of the shaft 12. This coupling construction is shown and described in the aforesaid copending application. The spindle 20 projects outwardly of the tubular shaft 16 and cooperates with a threadedly locking nut 22 having handles 23 to clamp the assembly against wheel 14, thereby locking the wheel for rotation with shaft 12.

Referring now to FIG. 3, a bracket assembly generally indicated at 24 is shown mounted on the tubular shaft 16, said bracket assembly being loosely mounted thereon whereby it may remain fixed during rotation of the shaft 16. The bracket assembly 24 includes a tubular housing 26 that telescopes over the tubular shaft 16 and has an upstanding pin 28 secured thereto adjacent the front portion thereof. Joined to the under side of the housing 26 approximately opposite the upstanding pin 28 and extending laterally across the under side of the housing is a tubular lug 30. The tubular lug 30 is internally threaded and receives a bolt 32 therein that is adapted to secure a roller bracket 34 thereto. The roller bracket 34 (FIG. 1) is formed in an inverted U-configuration and has spaced upstanding ears 36 joined thereto. Openings are formed in the ears 36 for receiving the bolt 32, and as shown in FIG. 1, the lug 30 fits between the ears 36 and is secured in place therebetween by the bolt 32, thereby pivotally mounting the bracket 34 beneath the housing 26. A roller 38 is positioned between the legs of the U-shaped bracket 34 and is mounted for rotation therebetween on a shaft 40 that is suitably journalled in bearings fixed within the hub 41 of the roller.

The angular position of the roller 38 is adapted to be adjusted with respect to the wheel 14 and for this purpose a turnbuckle assembly indicated at 42 is provided and includes head members 44 and 46 that have threaded extensions 48, 50 joined thereto, respectively, the extensions 48, 50 threadably engaging an internally threaded elongated hex nut 51. As seen in FIG. 3, the head member 44 is pivotally connected by a bolt 52 to a downwardly depending lug 54 that is secured to the under side of the housing 26, while the head member 46 is pivotally connected by a bolt 56 to an outstanding lug 58 that is joined to the outer leg of the U-shaped bracket 34. It is seen that the angular position of the roller 38 may be conveniently adjusted with respect to the wheel 14 by simply loosening the bolts 52 and 56 and rotating the hex nut 49. As shown in FIG. 3, the roller 38 is adapted to engage the bead 8 of the tire 7 and upon continuous rotation of the wheel 14 will tend to force the tire bead 8 over the outer flange 3 of the rim 2.

Cooperating with the bracket assembly 24 is a forcing tool generally indicated at 60. The forcing tool 60 includes a tubular handle that is formed in two end sections 62 and 64, the handle end sections 62, 64 including opposed end flanges 66. Extending into the handle sections 62, 64 and pinned therein by dowels 68, 70 is an intermediate handle section 72 formed with a central bearing portion 74. The central bearing portion 74 is of slightly greater diameter than the intermediate handle section 72 and abuts against the end flanges 66. Rotatably mounted on the bearing portion 74 is a circular forcing wheel 76, the outer peripheral edge of which is rounded as shown more clearly in FIG. 2. The wheel 76 is positioned so that upon contact with the tire 7, the axis of the wheel 76 is generally perpendicular to the axis of the wheel 14. The rounded edge of the wheel 76 then engages the side wall of the tire 7 so that the component of force applied thereto is the maximum for the power supplied and the adjacent bead is thus easily forced into the recess or well 6 of the rim 2. Sufficient room is then provided to enable the roller 38 to force the portion of the bead engaged thereby over the adjacent portion of the rim flange 3. For reasons hereinafter to be made apparent, it is important to note that forcing wheel 76 is provided with a relatively thin radial web portion 77.

In order to pivotally mount the forcing tool 60, the handle section 64 has a capped socket member 78 secured to the outer end thereof that is adapted to engage the upstanding pin 28 in bearing relation therewith. It is seen that the operator of the tire mounting device may easily exert the force necessary to deflect the side wall of the tire by placing the socket on the pin 28 and then pivoting the forcing tool handle thereon. The forcing wheel 76 is further positioned approximately 90° from the roller 38 with respect to the wheel circumference which, as will be described, aids in the mounting operation.

In operation, the wheel 14 carrying the rim 2 is first mounted on the wheel cone that is secured to the outer end of the shaft 12 by coupling the spindle 20 to the shaft 12 and then sliding the wheel holding shaft 16 and retaining disc 18 over the spindle. The bracket assembly 34, including the roller 38, is then secured in position by locating the retaining disc firmly against the outer face of the wheel 14 and positioning the housing 26 on the shaft 16, after which locking nut 22 is rotated to clamp shaft 16 and disc 18 in locking position. With the tire 7 loosely mounted on the rim 2 so that the bead 9 is in place against the rim flange 4, the angular position of the roller 38 is properly adjusted by manipulation of turnbuckle assembly 42. The shaft 12, tire 7, wheel 14 and tire mounting assembly may be elevated to any desired position by a lifting device incorporated in the power operated apparatus 10, as shown and described in the aforesaid copending application. The shaft 12 is then caused to be rotated by drive mechanism incorporated in the power operated apparatus 10, thereby rotating the wheel 14. Since the housing 26 freely engages the tubular shaft 16 in bearing relation therewith, and the roller 38 engages the tire 7, the bracket assembly 42 will have no tendency to rotate with wheel 14. The socket member 78 is then slipped over the upstanding pin 28 and the forcing tool handle pivoted with respect to the bracket assembly 24 to move the forcing wheel 76 into contacting relation with the side wall of the tire, it being apparent that interengagement of tool 60 with assembly 24 will further restrict and prevent rotation of the latter. As will be obvious, wheel 76 is spaced from socket 78 a distance just sufficient to enable the wheel to clear rim flange 3, since it is desirable that pressure be exerted on the tire wall at a point as close to the tire bead as possible. Also, during the pivotal or forcing movement of wheel 76 against the tire wall, it has been found that a better and more effective thrust can be imparted by using a forcing wheel having a thickened bead-like peripheral edge and a reduced radial web, since the latter affords more clearance as the tool is pivoted, or, expressed differently, there is less likelihood of the rim flange 3 interfering with the inward pivotal movement of the tool by making engagement with the radial face of wheel 76.

As shown by the arrow in FIG. 1, the wheel 14 is rotated in a counterclockwise direction, whereby the forcing wheel 76 engages the tire 7 prior to the engagement thereof by the roller 38. For the first quarter turn of the wheel 14, the tire bead 8 is easily forced over the flange 3. However, after this, in order to provide sufficient clearance to force the bead 8 over the flange 3, it is necessary to force the bead adjacent the tool 60 into the well or recess 6 of the rim 2. By spacing the wheel 76 approximately 90° from the roller 38, the wall of the tire may be sufficiently deflected to force enough of the bead 8 within the well 6 to enable the roller 38 to force the bead engaged thereby over the flange 3. As the tire and wheel rotate on the shaft 12, the forcing wheel 76 is moved by the operator against the adjacent side wall of the tire. Just enough pressure is exerted for wheel 76 to move the bead 8 into the well 6. As the tire and wheel continue to rotate, the roller 38 which engages the adjacent portion of the bead 8 forces it over the rim flange 3. Once the tire is completely mounted on the rim, the wheel 76 is withdrawn and the resiliency of the tire causes the portion of the bead forced into the well 6 to snap outwardly and into contact with flange 3. During all of this operation, the rotatable mountings of wheel 76 and roller 38 enable a relatively smooth and friction-free action to be achieved, since these members will be continuously rotated as a result of their frictional engagement with the rotating wheel and tire. If these members were not rotatable, there would be a tremendous frictional drag during the mounting operation.

It will be obvious to those skilled in the art that various changes may be made without departing from the spirit of the invention and therefore the invention is not limited to what is shown in the drawings and described in the specification, but only as indicated in the appended claims.

What is claimed is:

1. In apparatus for mounting a tire on a wheel having a flanged drop-center rim, means for rotatably carrying said wheel in a tire mounting position, means for securing said wheel to said carrying means, a bracket assembly engaging said securing means and fixed in relation with respect thereto, said bracket assembly including a tubular housing, a roller housing pivotally mounted on the under side of said tubular housing, a roller secured in said roller housing and angularly disposed with respect to the side wall of said tire, said roller being adapted to engage the bead of said tire during the tire mounting operation, an elongated handle engaging said bracket assembly and pivotal with respect thereto, a circular forcing tool mounted on said handle and displaced approximately 90° from said roller, said forcing tool being adapted to engage the side wall of said tire to force the adjacent bead into the drop-center of said rim, thereby enabling said roller to force the bead engaged thereby over the flange of said rim.

2. In apparatus for mounting a tire on a wheel having a flanged drop-center rim, a horizontally disposed shaft rotatably carrying said wheel in a tire mounting position, means for securing said wheel to said shaft, whereby the axis of said wheel is substantially horizontal, bracket means engaging said securing means and fixed in relation with respect thereto, said bracket means including a roller the axis of which is angularly disposed with respect to the axis of said wheel, said roller being adapted to engage the adjacent bead of said tire during the tire mounting operation, tool means engaging said bracket means and including a wheel engaging the adjacent side wall of said tire for forcing the bead thereof into the drop center of said rim, thereby providing sufficient clearance for said roller to force the tire bead engaged thereby over the flange of said rim.

3. In apparatus for mounting a tire as set forth in claim 2, said bracket means further including an upstanding pin, said tool means including an elongated handle having a socket secured to the end thereof for pivotally engaging said upstanding pin.

4. In apparatus for mounting a tire as set forth in claim 2, said roller being movably mounted and said bracket means including a turnbuckle assembly operatively connected to said roller for adjusting the angular position thereof.

5. In apparatus for mounting a tire on a wheel having a flanged drop-center rim, a rotatable drive shaft carrying said wheel on the outer end thereof, the axis of said shaft being substantially horizontal, a tubular shaft having a spindle extending therethrough, said spindle being coupled to said drive shaft, a retaining disc secured to said tubular shaft and engaging the outer face of said wheel for locking said wheel on said drive shaft, whereby the axis of said wheel is substantially horizontal, a tubular housing freely mounted on said tubular shaft whereby the former is adapted to remain stationary while the latter rotates, an angularly disposed roller operatively secured to the under side of said housing and adapted to engage the adjacent bead of said tire, a forcing tool pivotally engaging said housing and including an elongated handle and a forcing wheel mounted thereon intermediate the ends thereof, said forcing wheel engaging the adjacent side wall of said tire for forcing the bead thereof into the drop center of said rim thereby providing sufficient clearance to enable said roller to force the tire bead engaged thereby over the flange of said rim.

6. In apparatus for mounting a tire as set forth in claim 5, means operatively connected to said housing for adjusting the angular position of said roller.

7. In apparatus for mounting a tire as set forth in claim 5, said housing having an upstanding pin formed on the upper side thereof, said forcing tool including a socket member for engaging said upstanding pin to pivotally mount said forcing tool on said housing.

8. In apparatus for mounting a tire on a wheel having a flanged drop-center rim, means for rotatably carrying said wheel in a tire mounting position, means for securing said wheel to said carrying means, a bracket assembly engaging said securing means and including a roller that is adapted to engage the adjacent bead of said tire, the axis of said roller being angularly disposed with respect to the axis of said wheel, means associated with said bracket assembly and operatively engaging said roller for adjusting the angularity thereof, and tool means angularly displaced from said roller and engaging the side wall of said tire for forcing the tire bead adjacent thereto into the drop center of said rim, thereby providing sufficient clearance for said roller to force the tire bead engaged thereby over the flange of said rim.

References Cited in the file of this patent

UNITED STATES PATENTS

| | | |
|---|---|---|
| 710,135 | Blake | Sept. 30, 1902 |
| 1,341,727 | I. A. Weaver | June 1, 1920 |
| 1,587,634 | Dickey et al. | June 8, 1926 |
| 1,720,615 | Welch | July 9, 1929 |
| 1,869,680 | Freeman | Aug. 2, 1932 |
| 2,505,172 | Coats | Apr. 25, 1950 |
| 2,569,788 | R. A. Weaver | Oct. 2, 1951 |
| 2,581,569 | Zugaro et al. | Jan. 8, 1952 |
| 2,845,969 | Duquesne | Aug. 5, 1958 |
| 2,912,047 | Douglas et al. | Nov. 10, 1959 |